United States Patent
Foerg

(10) Patent No.: US 9,857,019 B2
(45) Date of Patent: Jan. 2, 2018

(54) INSULATION MATERIAL AS WELL AS INSULATION ELEMENT FOR A PIPE IN THE VICINITY OF A WALL OR CEILING DUCT

(71) Applicant: Hilti Aktiengesellschaft, Schaan (LI)

(72) Inventor: Christian Foerg, Lamerdingen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/905,749

(22) PCT Filed: Jul. 17, 2014

(86) PCT No.: PCT/EP2014/065376
§ 371 (c)(1),
(2) Date: Jan. 15, 2016

(87) PCT Pub. No.: WO2015/007842
PCT Pub. Date: Jan. 22, 2015

(65) Prior Publication Data
US 2016/0153605 A1   Jun. 2, 2016

(30) Foreign Application Priority Data
Jul. 18, 2013   (EP) ..................................... 13177015

(51) Int. Cl.
*F16L 9/14*   (2006.01)
*F16L 59/02*   (2006.01)
*F16L 5/04*   (2006.01)

(52) U.S. Cl.
CPC ............... *F16L 59/021* (2013.01); *F16L 5/04* (2013.01)

(58) Field of Classification Search
CPC .......... F16L 5/04; F16L 59/021; A62C 2/065; Y10T 137/1819
USPC ................................ 138/149; 52/220.8, 232
See application file for complete search history.

(56) References Cited

U.S. PATENT DOCUMENTS

| 1,668,635 | A | * | 5/1928 | De Stefani ........... B67D 1/1405 138/109 |
| 2,903,018 | A | * | 9/1959 | Goff ........................ F16L 59/15 138/140 |
| 3,134,611 | A | * | 5/1964 | Iversen ................. F15B 21/008 138/110 |
| 3,230,121 | A | | 1/1966 | Nitzsche et al. |

(Continued)

FOREIGN PATENT DOCUMENTS

| DE | 30 25 309 A1 | 2/1982 |
| DE | 30 41 731 A1 | 6/1982 |

(Continued)

OTHER PUBLICATIONS

PCT/EP2014/065376, International Search Report (PCT/ISA/220 and PCT/ISA/210) dated Aug. 26, 2014, with partial English translation, enclosing Written Opinion of the International Searching Authority (PCT/ISA/237) (Fourteen (14) pages).

*Primary Examiner* — Patrick F Brinson
(74) *Attorney, Agent, or Firm* — Crowell & Moring LLP

(57) ABSTRACT

An insulation material for use on a heat-conducting pipe is disclosed. The insulation material has an exterior surface and an interior surface which, when used, lies on the pipe to be insulated. The exterior surface, when used on the pipe to be insulated, defines an exterior circumference of the insulation material which varies over the axial length of the insulation material.

8 Claims, 4 Drawing Sheets

(56) References Cited

U.S. PATENT DOCUMENTS

| | | | |
|---|---|---|---|
| 3,396,129 A | 8/1968 | Yeadon et al. | |
| 4,338,412 A | 7/1982 | von Bonin | |
| 4,363,199 A * | 12/1982 | Kucheria | F16L 5/02 52/220.8 |
| 4,367,295 A | 1/1983 | von Bonin | |
| 4,380,593 A | 4/1983 | von Bonin et al. | |
| 4,751,031 A * | 6/1988 | Baars | H02G 3/22 264/268 |
| 5,129,201 A * | 7/1992 | Robertson | A62C 2/065 52/220.8 |
| 5,173,515 A | 12/1992 | von Bonin et al. | |
| 5,452,551 A * | 9/1995 | Charland | F16L 5/04 52/1 |
| 5,934,333 A | 8/1999 | Muenzenberger et al. | |
| 6,291,043 B1 * | 9/2001 | Abbott | F16L 59/166 138/149 |

FOREIGN PATENT DOCUMENTS

| | | |
|---|---|---|
| DE | 33 02 416 A1 | 7/1984 |
| DE | 34 11 327 A1 | 10/1985 |
| DE | 39 17 518 A1 | 12/1990 |
| DE | 196 53 503 A1 | 6/1998 |
| EP | 0 043 952 B1 | 1/1982 |
| EP | 0 051 106 B1 | 5/1982 |
| EP | 0 061 024 B1 | 9/1982 |
| EP | 0 116 846 B1 | 8/1984 |
| EP | 0 158 165 B1 | 10/1985 |
| EP | 0 244 514 A1 | 11/1987 |
| EP | 0 274 068 A2 | 7/1988 |
| EP | 0 662 578 A1 | 7/1995 |
| EP | 1 347 549 A1 | 9/2003 |
| EP | 1 641 895 B1 | 4/2006 |
| EP | 2 273 637 A2 | 1/2011 |
| FR | 2 406 903 A1 | 5/1979 |
| GB | 970 724 | 9/1964 |
| GB | 1 546 786 | 5/1979 |

\* cited by examiner

INSULATION MATERIAL AS WELL AS INSULATION ELEMENT FOR A PIPE IN THE VICINITY OF A WALL OR CEILING DUCT

This application claims the priority of International Application No. PCT/EP2014/065376, filed Jul. 17, 2014, and European Patent Document No. 13177015.8, filed Jul. 18, 2013, the disclosures of which are expressly incorporated by reference herein.

BACKGROUND AND SUMMARY OF THE INVENTION

The invention relates to an insulation material for use on a heat-conducting pipe as well as an insulation element for a pipe in the vicinity of a wall or ceiling duct.

From prior art, it is known to protect pipes passing through a wall or a ceiling in a fire protection-related manner to prevent the fire from spreading. To ensure fire protection, mineral wool fiber shells of approx. 1 m in length are typically used as insulation material and are laid around the pipe to be protected. The insulation material used thereby extends to the wall and is applied to both sides of the wall. To prevent a burn-through, an annular gap in the wall, which is formed when the pipe is run through a wall opening, is also sealed with a sealing agent. The thickness of the insulation material used is thereby dependent on the maximum permissible temperature in the vicinity of the wall and the expected temperatures.

Among the known insulation materials, it has proven to be disadvantageous that their insulating effect is so good that for very heat-conductive pipes, such as aluminum pipes, an elevated temperature occurs on the side of the insulation facing away from the wall and that lies outside the desired temperature range. The temperature rose partly above the critical range, i.e., a temperature increase of more than 180° K. was observed. The possibility of the fire spreading via the heated pipe hereby exists.

It is thus the object of the invention to provide an insulation material, which ensures that the temperature of the insulation always lies in the desired range.

According to the invention, the object is achieved by means of an insulation material for use on a heat-conducting pipe, with an exterior surface and an interior surface, which, when used, lies against the pipe to be insulated, wherein the exterior surface, when used on the pipe to be insulated, defines the exterior circumference of the insulation material, which varies over the axial length of the insulation material (corresponds to the axial expansion of the pipe). In this way, the insulating effect of the insulation material can vary over the axial length, so that for example good insulation is possible in one region, and a higher heat dissipation is possible in another section. Generally, one can thereby improve the fine adjustment of the insulation element.

According to one aspect of the invention, it is provided that the exterior circumference diminishes toward a free end of the insulation material, i.e., the thickness of the insulation material decreases starting at the wall or ceiling in an axial direction of the pipe. A high degree of insulation in the vicinity of the wall and higher heat dissipation toward the free end of the insulation material is thereby achieved, so that the high temperatures in the wall region are not conveyed to the free end. All in all, the heat dissipation can thus to a large extent be kept constant over the axial length of the insulation material.

In particular, the exterior circumference is largest in the vicinity of a wall through which the insulating pipe passes. This offers the advantage that the insulation is greatest in the vicinity of the wall, since this is where the expected temperatures are also the highest.

According to another aspect of the invention, it is provided that the insulation material has a section that extends with the pipe to be insulated through a wall opening. This means that the insulation material can be pushed through a wall opening, whereby the insulation material is also present inside the wall. As a result, the pipe to be insulated is insulated on both sides of the wall through which the pipe passes.

Furthermore, one can omit a sealing agent in the annular gap if the section is correspondingly fitted to the wall opening.

In particular, the exterior surface runs in an essentially conical or frusto-conical manner. This represents an optimal geometry of the insulation material, whereby a very good compromise between insulation and heat dissipation is possible, so that an even temperature trend is achieved over the entire axial length of the insulation material.

Another aspect of the invention provides that the interior surface is structured, having in particular nubs or conical and/or wedge-shaped ribs. The structuring enables one to achieve that the insulation material, when wrapping the pipe, is ideally adjusted, particularly to varying pipe radii. In addition, the structuring enables one to adjust the insulation and heat dissipation behavior.

Furthermore, it is provided that the exterior surface, in its cross-section, runs in a roughly hyperbola-shaped manner. In terms of its heat conductivity and insulation property, the insulation material can be adjusted optimally to the temperature trend, so that the temperature is constant over the axial length.

Another aspect of the invention provides that the insulation material consists of a very elastic insulation material, particularly an insulation foam or mineral wool. These materials are particularly well suited since they are very malleable and thus can be simply placed around the pipe to be insulated.

Suitable materials that exhibit no intumescence in the event of fire are for example polyethylene (PE), polyurethane (PUR), rubber, or ethylene-propylene diene monomers (EPDM).

Alternatively, particularly when larger annular gaps up to approximately 10 nm are to be sealed, intumescent foam materials can also be used. These consist of a foamable binding agent that contains an intumescent substance mixture. The binding agent thereby serves as a bond-forming carrier for the intumescent substance mixture. Preferably, the substance mixture is distributed homogeneously in the binding agent. The bond-forming carrier is preferably selected from the group consisting of polyurethanes, phenol resins, polystyrenes, polyolefins, such as polyethylene and/or polybutylene, melamine resins, melamine resin foams, synthetic or natural rubber, cellulose, elastomers and blends thereof, wherein polyurethane is preferred.

The ash-forming and if applicable intumescent substance mixture includes the conventional fire protection additives known to a person skilled in the art, which in the event of fire, in other words when exposed to heat, foam up and thereby form a flame propagation-impeding foam, such as an intumescent material on the basis of an acid-forming substance, a carbon-supplying compound, and a gas-forming substance. Preferably, the intumescent material includes: as acid-forming substances, a salt or an ester of an inorganic, non-volatile acid selected from sulfuric acid, phosphoric acid, and boric acid; as a carbon-supplying compound, a polyhydroxy compound and/or a thermoplastic or thermosetting polymeric resin binding agent; and as a gas-forming substance, a chlorinated paraffin, melamine, a melamine compound particularly melamine cyanurate, melamine phosphate, melamine polyphosphate, tris(hydroxyethyl)-cyanurate, cyanamide, dicyanamide, dicyandiamide, biguanidine, and/or a guanidine salt, particularly guanidine phosphate or guanidine sulfate.

The compound-forming carrier can also contain as an ablative additive an inorganic compound, which has water, e.g., as crystal water, firmly embedded in it and does not dry out at temperatures up to 100° C., but does release it starting at 120° C. in the event of fire. Temperature-conducting parts can thereby be cooled. Preferred is an inorganic hydroxide or hydrate releasing water at the fire temperature or when exposed to flame, particularly aluminum hydroxide, aluminum oxide hydrates or partially hydrated aluminum hydroxides. However, one can consider other inorganic hydroxides or hydrates releasing water when exposed to flame, as they are described in EP 0 274 068 A2.

Such compounds that can be used as substance mixtures in the fire protection insert according to the invention are known to a person skilled in the art and are disclosed for example in the following publications, which are hereby explicitly referred to: DE 30 25 309 A1, DE 30 41 731 A1, DE 33 02 416 A1, DE 34 11 327 A1, EP 0 043 952 B1, EP 0 051 106 B1, EP 0 061 024 B1, EP 0 116 846 B1, EP 0 158 165 B1, EP 0 274 068 A2, EP 1 347 549 A1, EP 1 641 895 B1 and DE 196 53 503 A1.

The fire protection insert can be produced for example by mold foaming, such as reaction foaming (RIM) according to DE 3917518, e.g., with Fomox® fire protection foam or the barrier layer-forming construction material HILTI CP 65GN. Materials that can be used for purposes according to the invention are known from EP 0061024 A1, EP 0051106 A1, EP 0043952 A1, EP 0158165 A1, EP 0116846 A1 and U.S. Pat. No. 3,396,129 A as well as EP 1347549 A1. The molded object preferably consists of an intumescence-capable polyurethane foam as it is known from EP 0061024 A1, DE 3025309 A1, DE 3041731 A1, DE 3302416 A and DE 3411 327 A1.

Another aspect of the invention provides that a fabric insert is provided, particularly in the region of the interior surface. The fabric insert thereby serves to improve the wrappability of the insulation material.

The insulation material can be designed to consist of one piece or of multiple layers. In the one-piece design of the insulation material, it consists of a wedge-shaped mat for example, which is wrapped around the pipe to be insulated. Alternatively, it is also possible that the insulation material consists of multiple layers, wherein the number of layers increases toward the wall through which the pipe extends. In this way, an approximately wedge-shaped cross-section of the insulation is obtained, which runs in a step-like manner due to the layers.

Another aspect of the invention is that the insulation material has on the exterior surface an additional adhesive tape, particularly an adhesive tape with glass fiber filaments. This adhesive tape ensures that the applied insulation material is fixed to the pipe. The glass fiber filaments melt at elevated temperatures, and a ceramic-like material-melt-decomposition product, which ensures secure fixation of the insulation material to the pipe to be insulated, is formed.

Furthermore, the invention relates to an insulation element for a pipe in the vicinity of a wall or ceiling duct, with an insulation material that surrounds the pipe, wherein the insulation material extends to the wall or ceiling, or extends through the duct itself, wherein the insulation element has a larger diameter at the axial end facing the duct than on the axial end facing away from the duct. For such an insulation element, an insulation material of the aforementioned type can be used, wherein the aforementioned advantages apply analogously for the insulation element.

The insulation material according to the invention and the insulation element according to the invention are used for insulating pipes, particularly heat-conducting pipes, wherein the pipes themselves may already be furnished with an insulation element not equipped to protect against fire.

The insulation may be produced as a pipe shell or as roll material, wherein the roll material is preferred.

Additional advantages and features of the invention are found in the description below and in the drawings below that are referred to.

DETAILED DESCRIPTION OF THE DRAWINGS

Figure 1:
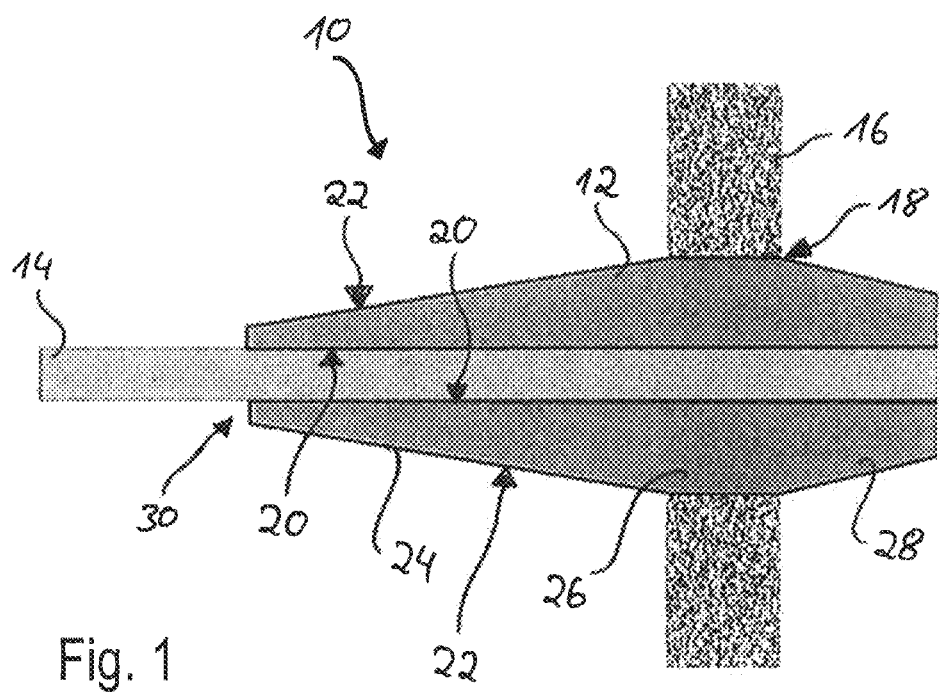
FIG. 1 depicts a first embodiment of the insulation according to the invention in a cross-section view.

FIG. 1 depicts an insulation element 10, which includes an insulation material 12. Insulation material 12 thereby surrounds pipe 14, which passes through a wall 16 in the vicinity of a wall duct 18.

Insulation material 12 has an interior surface 20, which is oriented to pipe 14, as well as an exterior surface 22, which is opposite interior surface 20. Insulation material 12 is wrapped around pipe 14, so that it surrounds pipe 14 in a circumferential manner.

In the depicted embodiment, insulation material 12 is designed in a one-piece manner and it can be subdivided into three sections: a first section 24, a second section 26, and a third section 28.

First section 24 extends from a first free end 30 of insulation material 12 to wall 16, where it transitions into second section 26 that extends over the length of wall duct 18, to then merge into third section 28 behind wall 16 as seen from first section 24. Third section 28 in turn extends from wall 16 to a second free end of insulation material 12, which is not depicted.

The first and third section 24, 28 are mirror-symmetrical to wall 16, wherein exterior surface 22 of insulation material 12 runs inclined, relative to pipe 14, in first section 24 and third section 28, so that first and third section 24, 28 are wedge-shaped in their cross-section.

This means that the exterior circumference of insulation material 12 wrapped around the pipe changes over the axial length of insulation material 12, wherein the exterior circumference of second section 26 has the greatest diameter of insulation element 10. Second section 26 is thereby formed in such a manner that it closes up wall duct 18 in a sealing manner.

Over the entire axial length of insulation material 12, interior surface 20 of insulation material 12 runs parallel to pipe 14, wherein interior surface 20 is always in contact with pipe 14.

Figure 2:
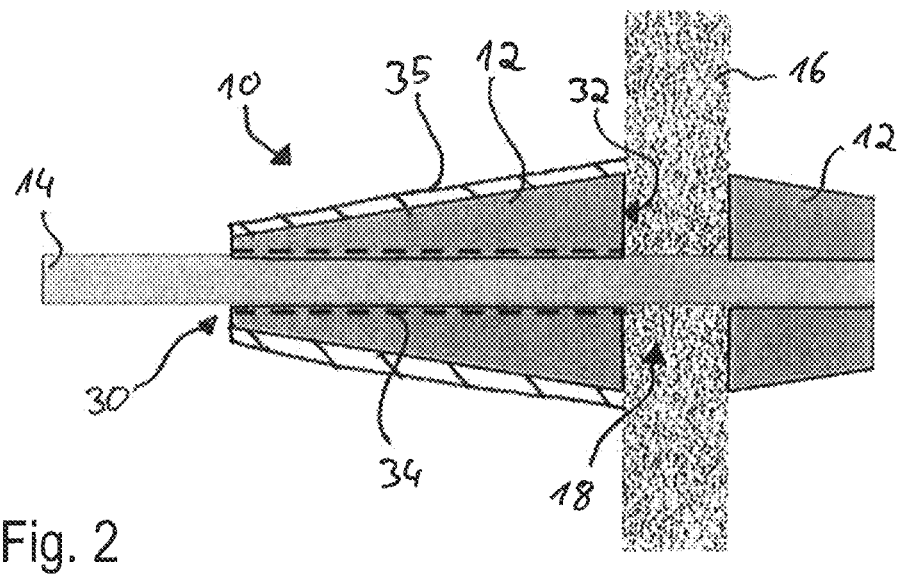
FIG. 2 depicts a second embodiment of the insulation element.

FIG. 2 depicts a second embodiment of insulation element 10, wherein insulation element 10 has an insulation material 12, which in contrast to the first embodiment is not run through wall duct 18, but whose contact surface 32 contacts wall 16.

Insulation material 12 of the second embodiment from FIG. 2 corresponds approximately to first section 24 of insulation material 12 of the first embodiment from FIG. 1. Insulation material 12, of the second embodiment according to FIG. 2, wrapped around pipe 14 is formed in a frusto-conical shaped manner, wherein the exterior circumference of the insulation material 12 is greatest in the vicinity of wall 16 or in contact surface 32. A wedge-shaped cross-section results over the entire axial expansion of the non-wrapped insulation material 12.

Insulation element 10 according to the second embodiment as depicted in FIG. 2 has two insulation materials 12, which are each arranged on both sides of wall 16, wherein insulation materials 12 with the larger exterior circumference are each oriented to wall 16 and contact wall 16 along contact surface 32.

Furthermore, the embodiment according to FIG. 2 provides a fabric insert 34, which is arranged in the region of interior surface 20 of insulation material 12. By means of fabric insert 34, insulation material 12 can be better wrapped around pipe 14, since fabric insert 34 provides stability, particularly for a soft insulation material 12.

Insulation materials 12 wrapped around pipe 14 are preferably held in their shape in a fixing manner by an adhesive tape 35, wherein adhesive tape 35 is furnished with glass fiber filaments, which melt at high temperatures and thereby form a ceramic-like material-melt-decomposition product. The latter has very high tear-resistance and thereby ensures that insulation material 12 lies on pipe 14 in a form-fitting manner even under extreme conditions.

Adhesive tape 35 is wrapped around insulation material 12 at least in a two-layered manner, wherein the layers do not run parallel to each other, since better fixing is thereby achieved when the glass fiber filaments melt.

As an alternative to adhesive tape 35 with glass fiber filaments, a filament adhesive tape can also be used.

Figure 3:
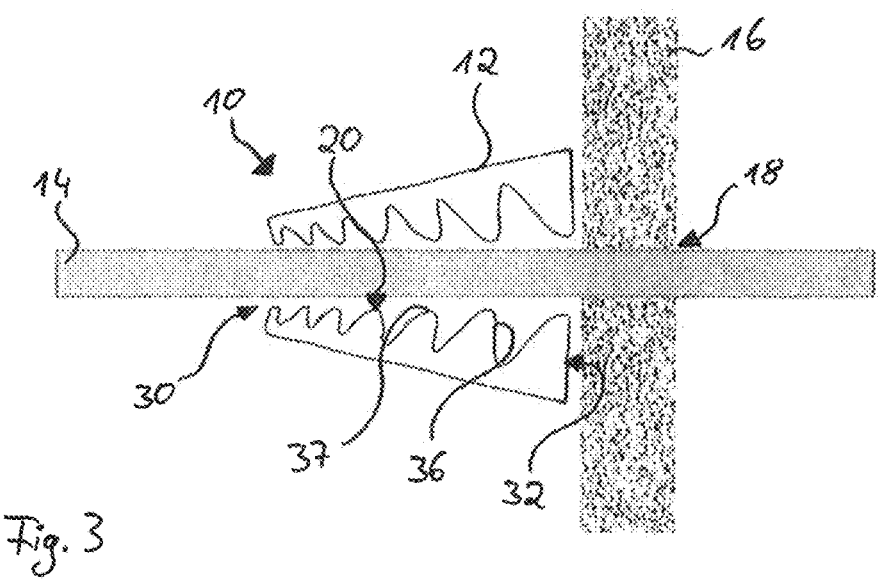
FIG. 3 depicts a third embodiment of the insulation element.

FIG. 3 depicts a third embodiment of insulation element 10, wherein the third embodiment differs from the second embodiment to the effect that interior surface 20 does not always contact pipe 14, but has a structuring 36.

In the depicted embodiment, structuring 36 is formed by nubs 37, whereby insulation material 12 contacts pipe 14 only via the nub tips of structuring 36.

Insulation material 12 is nonetheless designed to be wedge-shaped in its cross-section, so that the exterior circumference of wrapped insulation material 12 tapers toward free end 30, wherein the exterior circumference of insulation material 12 is in turn the greatest in the vicinity of wall 16 or contact surface 32.

Nubs 37 may in particular have various depths,

Such an insulation material 12 may be produced for example in such a manner that a normal convoluted foam is produced, whose nub depths differ, wherein a diagonal cut occurs, so that, in a cross-section, wedge-shaped insulation material 12 results with nubs 37 having various depths.

Figure 4:
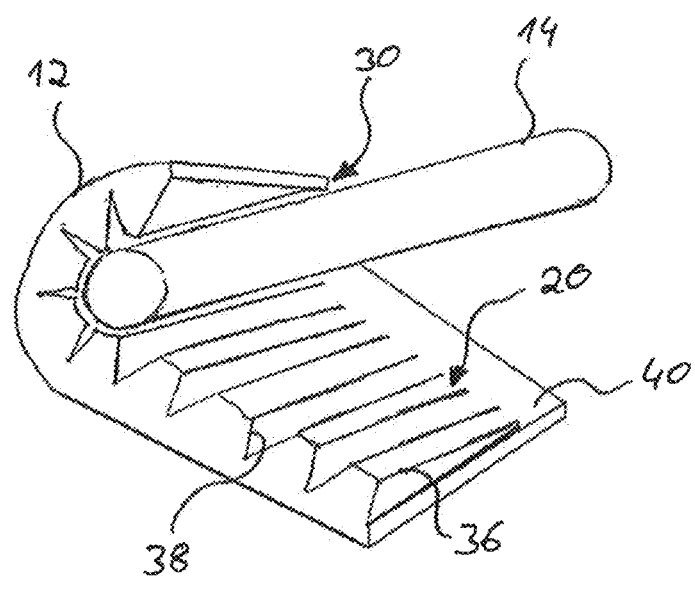
FIG. 4 depicts a fourth embodiment, of the insulation element.

FIG. 4 depicts a fourth embodiment of insulation element 10, which, like the third embodiment according to FIG. 3, also has a structuring 36 on interior surface 20.

Structuring 36 in the fourth embodiment consists of conically shaped ribs 38, which run in a wedge-shaped manner in the cross-section and contact these when wrapping pipe 14. By means of conical wedge ribs 38, it is possible to wrap insulation material 12 around pipe 14 in a simple manner.

Insulation material 12 according to the fourth embodiment has, in addition to ribs 38, a rib-free contact region 40.

When wrapping pipe 14, insulation material 12 over interior surface 20 lies on pipe 14 in such a manner that ribs 38 are arranged toward wall 16, so that the exterior circumference of insulation material 12 is greatest there. Toward the free end 30, the diameter of insulation material 12 tapers due to the conically shaped wedge ribs 38, wherein wedge ribs 38 transition into contact region 40, which lies entirely on pipe 14 in a circumferential manner.

Figure 5:
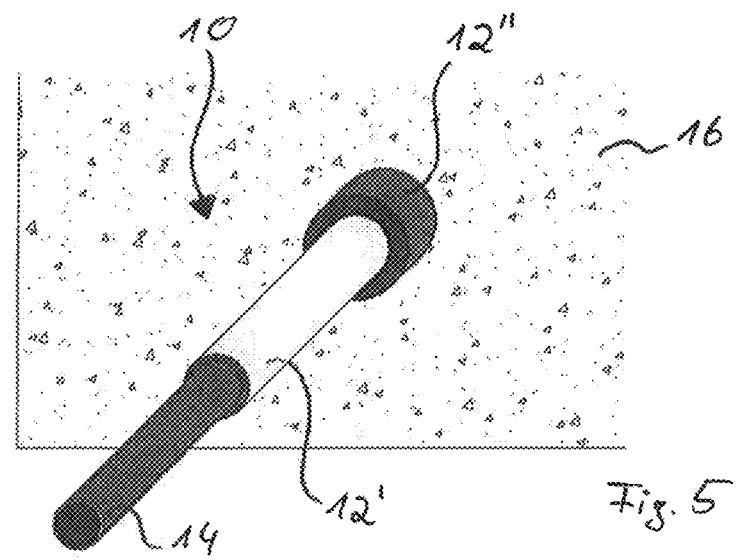
FIG. 5 depicts a fifth embodiment of the insulation element.

FIG. 5 depicts a fifth embodiment of insulation 10 according to the invention, wherein insulation element 10, according to the fifth embodiment, is constructed in a manner consisting of multiple layers of insulation material 12', 12".

Pipe 14 is thereby first wrapped by a first layer of insulation material 12' up to wall 16. Then, in the vicinity of wall 16, a second layer of insulation material 12" is wrapped around pipe 14 and the first layer of insulation material 12'. As a result, entire insulation element 10, which consists of multiple layers of insulation material 12', 12", has the greatest exterior circumference in the vicinity of wall 16. This ensures an insulation element 10, which has in its cross-section a step-shaped and approximately wedge-shaped form.

Instead of two-step insulation element 10, one can also conceive of a three- or even a multi-step insulation element 10, wherein the number of layers increases the fine adjustment of the insulating effect or heat dissipation.

Insulation element 10 built up in such a manner can be executed out of simple or commercially available insulation materials 12, which are designed as normal insulation barrier substance materials.

Figure 6:
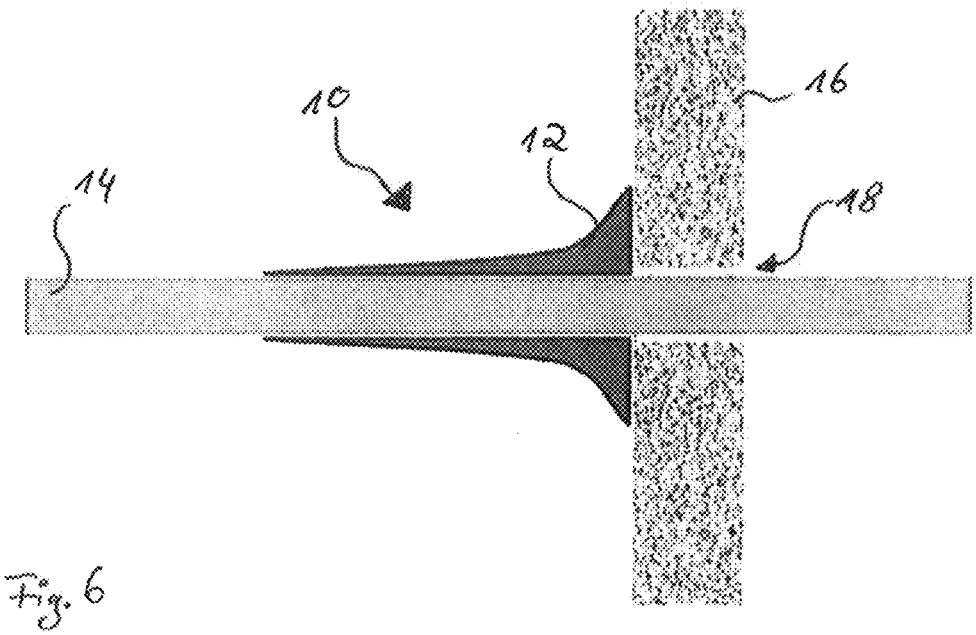
FIG. 6 depicts a sixth embodiment of the insulation element.

FIG. 6 depicts a sixth embodiment of insulation element 10 according to the invention, which shows an insulation element 10 optimally adapted to the conditions. Insulation element 10 according to the sixth embodiment consists of an insulation material 12, which has an exterior circumference that is designed in a hyperbola-shaped manner in its cross-section. This is also referred to as an "elephant's foot", wherein the exterior circumference of insulation material 12 is greatest in the vicinity of wall 16 and tapers toward free end 30 in such a manner that an optimal heat transfer of pipe 14 to the surroundings is achieved.

Depicted insulation elements 10 can all be designed in such a manner that they seal off the annular gap of wall duct 18, so that an additional material to be inserted in the annular gap is no longer necessary.

Figure 7:
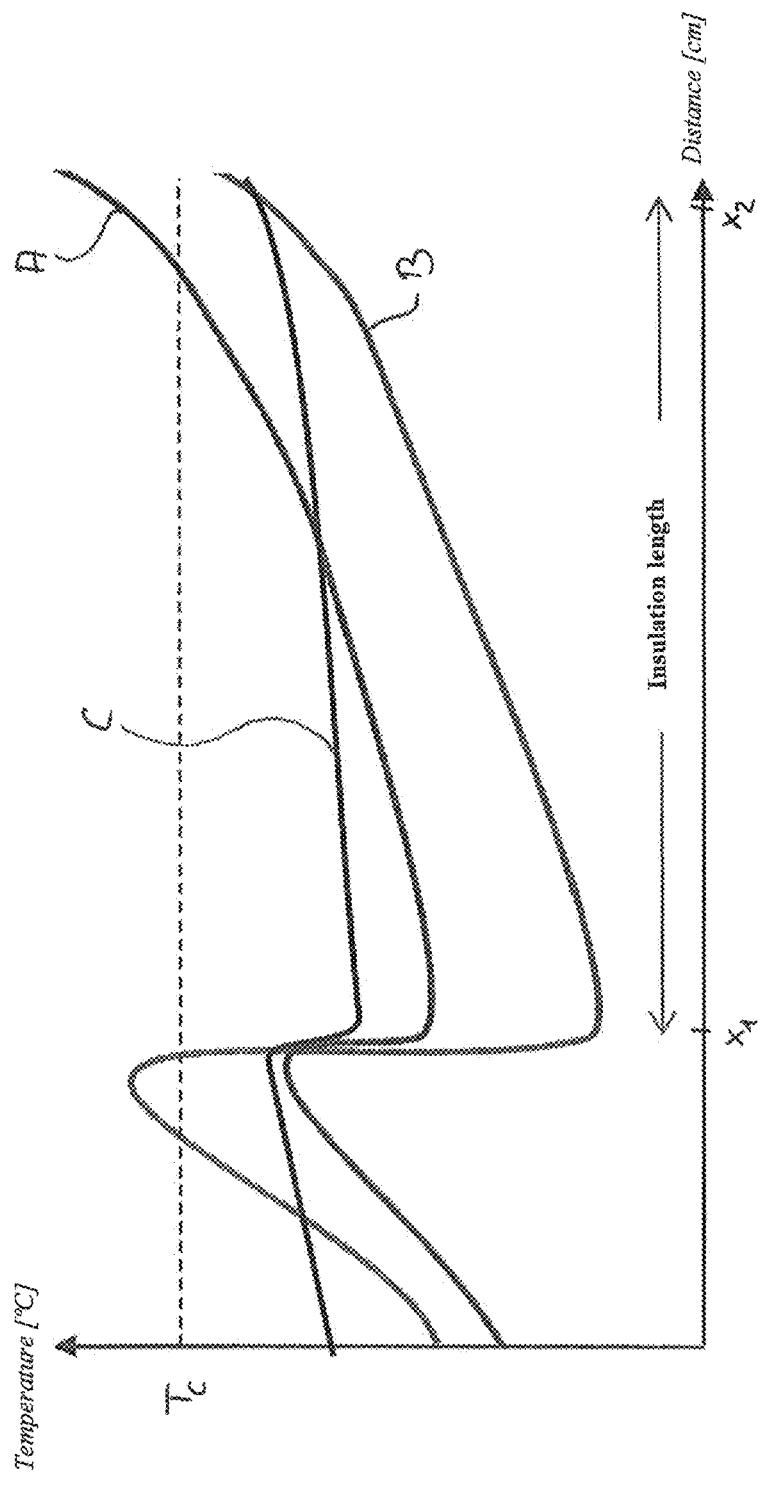
FIG. 7 depicts a diagram of the temperature trend along various insulating elements.

All depicted embodiments share in common that an approximately even temperature trend or approximately even heat dissipation is possible over the entire axial length of insulation material 12, as is evident from a comparison of the temperature trends in FIG. 7.

FIG. 7 depicts a diagram of the temperature trend along an insulated pipe 14, wherein the temperature outside of insulation 10 was measured. As a guide, a temperature limit TC is shown in a dashed line, which should not be exceeded. In addition, two distances x1 as well as x2 are indicated, which correspond to free end 30 and contact surface 32 respectively of insulation material 12.

All in all, three curves are depicted, wherein:
- Curve A depicts the temperature trend of an insulation element according to prior art with a low material thickness of the insulation material,
- Curve B depicts the temperature trend of an insulation element according to prior art with a large material thickness of the insulation material, and
- Curve C depicts the temperature trend of an insulation element 10 according to the invention.

By means of Curve A, one can clearly see that the temperature exceeds critical value TC in the vicinity of wall 16 at x2, since the material thickness was selected to be too low.

Curve B exemplifies the problem of a length of insulation material selected to be too short, since on the free end at x1, a strong temperature increase occurs, so that critical temperature TC is exceeded at free end 30. This is due to the fact that the insulation insulates so well that no interaction with the surroundings is possible, such that the elevated temperature of wall 16 is conveyed to the free end 30 of the insulation element.

The temperature trend of insulation element 10 according to the invention, represented by Curve C, illustrates that according to the invention an approximately constant temperature trend is achieved and that in particular the temperature lies below critical temperature TC over the entire axial length of insulation element 10.

Due to the variable thicknesses of insulation element 10 or insulation material 12 according to the invention along the axial length, one achieves a high degree of insulation in the vicinity of wall 16 without hardly any heat being dissipated to the environment or the surroundings. Insulation element 10 or insulation material 12 then decreases the exterior circumference starting at the vicinity of wall 16 to free end 30 so that the insulating effect decreases slightly and the heat dissipation to the surroundings increases. In this way, the temperature dissipation to the environment is maintained approximately constant, whereby no sudden temperature spike at free end 30 of insulation material 12 occurs.

Furthermore, it is possible with insulation material 12 according to the invention that insulation material 12 requires a shorter length in comparison to the insulation material from prior art to provide the desired insulation, so that less material has to be used, since it can be implemented in a more targeted and more efficient manner. This is attributed in particular to the fact that the heat dissipation over the axial length is so great that the temperature over the axial length is maintained approximately constant, just below critical temperature TC. A bump in the temperature trend, as is the case for example in the temperature trend according to Curve B, does not occur. In this way, the entire dissipated heat quantity is greater over the axial length of insulation element 10 according to the invention.

Due to the shorter insulation segment required, the applicability of insulation element 10 is improved since pipes 14, which deviate away shortly after passing through, can also be protected in a simple manner.

As materials for insulation material 12, one preferably uses mineral wool or, due to the better formability, framed material, such as PE, PUR, rubber, or EPDM. These may be designed to be flame-retarding or even intumescent. The material properties as well as the corresponding design of insulation element 10 and embodiment are to be matched to the expected pipe temperatures.

The invention claimed is:

1. An insulation material for use on a heat-conducting pipe, comprising:
    an exterior surface;
    an interior surface;
    wherein when in use the interior surface lays on a pipe to be insulated and the exterior surface defines an exterior circumference of the insulation material which varies over an axial length of the insulation material; and
    a fabric insert in a region of the interior surface.

2. The insulation material according to claim 1, wherein the exterior circumference decreases towards a free end of the insulation material.

3. The insulation material according to claim 1, wherein the exterior circumference is greatest in a vicinity of a wall through which the pipe to be insulated passes.

4. The insulation material according to claim 1, wherein the exterior surface has an essentially conical or frusto-conical shape.

5. The insulation material according to claim 1, wherein the insulation material is an elastic insulation material or an insulation foam or a mineral wool.

6. The insulation material according to claim 1, wherein the insulation material is an intumescent material.

7. An insulation material for use on a heat-conducting pipe, comprising:
    an exterior surface; and
    an interior surface;
    wherein when in use the interior surface lays on a pipe to be insulated and the exterior surface defines an exterior circumference of the insulation material which varies over an axial length of the insulation material;
    wherein the interior surface has nubs or conically-shaped wedge ribs.

8. An insulation material for use on a heat-conducting pipe, comprising:
    an exterior surface;
    an interior surface;
    wherein when in use the interior surface lays on a pipe to be insulated and the exterior surface defines an exterior circumference of the insulation material which varies over an axial length of the insulation material; and
    an adhesive tape disposed on the exterior surface and wherein the adhesive tape includes glass fiber filaments.

\* \* \* \* \*